INVENTOR.
Jarmil Pav
BY Michael J. Striker

INVENTOR.
Jarmil Pav
BY Michael J. Striker

United States Patent Office 3,451,630
Patented June 24, 1969

3,451,630
BEATING DEVICE FOR THE CONTINUOUS PROCESSING OF MATERIAL STOCK
Jarmil Páv, 34 Nad Mazankou, Prague 8, Czechoslovakia
Filed Apr. 28, 1964, Ser. No. 363,252
Int. Cl. B02c 1/08, 13/00, 19/12
U.S. Cl. 241—188                         7 Claims The present invention relates to a beating device for the continuous processing of material stock. More particularly, the invention relates to a beating device for processing paper stock and other materials, permitting very good control of the beating process in such a manner that the individual phases of the beating process may be separated to a maximum degree and the physico-chemical characteristics are affected so that the colloidal properties of cellulosic fibers are influenced to obtain a final product of desired quality.

The processing of a single or several starting components of fibrous raw materials in the preparation of the stock, having a quality which permits the attainment in the subsequent processing by the paper machine of a final product of desired properties, is primarily dependent upon the effect of the beating process. The technological machinery in which the beating process takes place affects the single fibers causing alterations in their structure that decisively determine the qualities of the final product of paper or paper board.

Successful meeting of demands made on management and maximum control of the beating process with a view to obtaining the required and predetermined extent of physico-chemical and colloidal alterations in the fiber structure depends on the design of the machinery. The design of the structural elements, just as that of the functional group of beating machines in the broader sense of the word, and its kinematics, must therefore start from a uniform conception in the system of alterations effected in the fiber by the functional elements of the machinery.

In the course of the beating process, the fibers usually processed in an aqueous medium are subjected to various types of combined strain. Corresponding to the amount of energy applied to the strain of fibers under simultaneous action of water, there take place slight or even far-reaching physico-chemical and colloidal alterations. These alterations affect, on the one hand, the surface layer and are generally designated as superficial fibrillation, and on the other hand, they involve also the internal structure of the fiber, so that these internal alterations are designated as internal fibrillation.

The knowledge of the influence of the structural alterations in the fibers on the properties of the paper produced in view of its function, should be applied in designing the functional elements of beating machines and in solving their kinematics within the possible technical limits. In essence, there is the question of instituting by the machinery such types of fiber strain, by which the kind and extent of alterations in the fibers can be controlled, and thereby the quality of paper to be produced can be adjusted. However, this difficult problem cannot be practically solved with the use of contemporary beating devices. Specialization of the contemporary beating devices consists merely in a partial limitation of the simultaneous occurrence of all the systems of alterations comprising internal and superficial fibrillation and fiber cutting or shortening.

The introduction of modern high speed paper making machines necessitated continualization of stock preparation processes. For that reason, the discontinuously operating beater has been discarded from modern stock preparation plants and replaced by continuously operating beating machines, the main representative thereof being those of the conical type. Despite various design improvements directed specifically to a definite phase of the beating process a rather unequal processing of the fibers is achieved.

In conical type beating devices, under usual conditions, only a minor part of the stock layer passing through the clearance between the cone surface circumscribed by the peripheral face of the rotor knives and the corresponding inner conical shell is processed. The major part of the stock passes through the stator interstices particularly without having been treated at all, or having been treated by friction only to a very limited degree.

In consequence, the effect on the fiber by a single passage through the machine is very slight and a rather unequal operation on the fibers occurs, so that unsatisfactory quality of the final product results. The regulability and control of the beating process is therefore of decisive significance in the choice of the suitable technological equipment.

The task of improving the regulability in the sphere of fibrillation was manifested in the design-improved disc devices or refiners in stock preparation plants. Disc devices or refiners differ from conical devices by the structural arrangement of the beating organs, just as by their hydromechanical properties. One of their characteristics is the relatively large area of active surface of the knives in relation to the total working area of the beating mechanism. The low depth of grooves in the beating organs and their shape influence the hydromechanical conditions of the machine in such a manner that the main through-passage is formed by the clearance between the superficial faces of the knives. In the working adjustment of the discs, the clearance between the same is substantially larger than that in the case of conical devices. Due to its structural arrangement, the disc type beating device strains the fibers of the processed stock primarily by friction and secondarily by compression and bending. At higher densities the shear is limited. However, these machines do not fully meet the demands made on the control of the beating process.

In order to improve the regulability of the beating process, development attention was directed to the design of machines intended for the first phase of the beating process, namely to fine pulping or fiberizing. For this purpose, machines were designed utilizing the disintegrator principle, wherein rotor organs encroach upon corresponding cavities in the stator or cavities of the counterrunning rotor, and vice versa. Due to the compression caused by the rotor and stator organs, pressure pulses arise in the processed stock and are utilized for completing the pulping of pulps; the number of pressure pulses being controlled by the number of rotor and stator organs and of revolutions of the machine.

However, the above-described devices do not satisfy the demands made on the beating process, in view of the fact that they can work economically only as machines for fine pulping and not for beating. None of these machines works on the ultrasonic principle. The formation of a mechanical oscillation, for example, ultrasound, necessitates an oscillation source, such as a vibrator, the oscillation of which is supplied to the ambient medium. The number of oscillations of a single vibrator is the qualitative characteristic of the mechanical oscillation. In the aforementioned machines, the condition for the source or vibrator is not fulfilled, since the pressure changes in the processed stock arise either simultaneously or successively at various points of the passage through the machine. Therefore, pressure changes or pulses cannot be categorized and no frequency course may be attributed to them.

A mechanical oscillation lying in the sonic or actually ultrasonic regions and its accompanying phenomena, for example, cavitation, can however cause remarkable results in the processing of cellulosic fibers.

In accordance with the present invention, a beating device for continuous preparation of paper stock, comprises disintegrator rings. At least one ring, designed as a resonance ring, bearing functional organs, is positioned coaxially with at least one exciting ring with functional organs, the rings being positioned adjacent each other or fitted closely together at one face.

In accordance with the present invention, the beating device comprises at least one resonance ring having an axis and a reference plane transverse to its axis. A first plurality of beams is positioned spaced from each other in circumferential direction by radial passages and extending substantially parallel with said axis from the reference plane of the resonance ring and adapted to oscillate at a determined frequency. At least one exciting ring having an axis and a second reference plane transverse to its axis has a plurality of beams spaced in circumferential direction by radial passages and extending substantially parallel with said axis from this reference plane, the beams of the exciting ring being of a determined number and having a determined configuration, determined positions and a determined circular pitch such that in operation the cooperation of the radial passages of the exciting ring with the radial passages of the resonance ring provides a frequency of pulses resonant to the determined resonant frequency of the beams of the resonance ring. The resonance ring and exciting ring are mounted coaxially with each other with a face of each of said rings adjacent a face of the other of said rings. When the resonance ring is rotated at a predetermined speed relative to the exciting ring, the beams of the resonance ring are caused to oscillate in circumferential direction at the determined resonant frequency thereof whereby the material stock is treated as explained below. Material stock is fed under a predetermined hydraulic pressure into the passages of the exciting rings and the beaten stock is derived from the passages in the resonance rings. The resonant frequency $\omega$ is determined by the equation $$\omega = \left[ \frac{EI \int_0^l \left(\frac{d^2y}{dx^2}\right)^2 dx}{\int_0^l my^2 dx} \right]^{1/2}$$

where $\omega$ is the frequency of vibration of one of said resonance ring beams in sec.$^{-1}$, $$m = \frac{\gamma}{g} \cdot F$$

is the mass of one cm. length of said one of said beams in kg. cm.$^{-2}$ sec.$^2$, $\gamma$ is the specific gravity of the material of said one of said beams in kg. cm.$^{-3}$, $g$ is the acceleration of gravity in cm. sec.$^{-2}$, F is the cross-sectional area of said one of said beams in cm.$^2$, E is the modulus of elasticity of the material of said beams in kg. cm.$^{-2}$, I is $bh^3/12$ i.e. the moment of inertia in the cross-section of said one of said beams in cm.$^4$, $b$ is the width of said one of said beams in cm., $h$ is the thickness of said one of said beams in cm., $y$ is the deflection as the function of the position $x$ to the longitudinal axis of said one of said beams in cm., and $l$ is the corresponding length of the integration range of said one of said beams in cm.

In accordance with the method of use of the present invention for the continuous processing of material stock and the like, the material stock is beaten between cooperating disintegrating rings. The material stock is beaten between spaced beams extending substantially axially from parallel reference planes of the disintegrating rings. The material stock is subjected to mechanical oscillation of the beams of one of the disintegrating rings in circumferential directions thereof relative to the axis of said one of the rings at a frequency $\omega$ determined by the equation $$\omega = \left[ \frac{EI \int_0^l \left(\frac{d^2y}{dx^2}\right)^2 dx}{\int_0^l my^2 dx} \right]^{1/2}$$

where $\omega$ is the frequency of vibration of each of said beams of one of said rings in sec.$^{-1}$, $$m = \frac{\gamma}{g} \cdot F$$

is the mass of one cm. length of said one of said beams in kg. cm.$^{-2}$ sec.$^2$, $\gamma$ is specific gravity of the material of said one of said beams in kg. cm.$^{-3}$, $g$ is the acceleration of gravity in cm. sec.$^{-2}$, F is the cross-sectional area of said one of said beams in cm.$^2$, E is the modulus of elasticity of the material of said one of said beams in kg. cm.$^{-2}$, I is $bh^3/12$, i.e. the moment of inertia in the cross-section of said one of said beams in cm.$^4$, $b$ is the width of said one of said beams in cm., $h$ is the thickness of said one of said beams in cm., $y$ is the deflection as the function of the position $x$ to the longitudinal axis of said one of said beams in cm., and $l$ is the corresponding length of the integration range of said one of the beams in cm.

In order that the present invention may be readily carried into effect, it will now be described with reference to the accompanying drawings, wherein:

FIG. 3a is a developed view, as seen in the radial direction of the rotor, of the rotor of FIGS. 1a and 2a;

FIG. 2a is an elevation, as seen in axial direction, of a stator and a rotor of the embodiment of FIG. 1a, only the stator being shown in section along line IIa—IIa of FIG. 4a;

FIG. 4a is a side elevation of a rotor and a stator of FIGS. 1a and 2a;

The stock processed in the beating device of the present invention is subjected especially to three main types of treatment.

The first type of treatment in processing the stock is the action of intensive mechanical oscillation with associated phenomena. Elastic vibrating members or vibrators, the functional organs of the resonance ring, are designed as unilaterally or bilaterally fixed beams. Each vibrator exerts bending oscillations. The oscillation node is logically formed at the point or points of fixation, the oscillation loop at the point of the loose end of the vibrator, or at the middle point of the bilaterally fixed vibrator, insofar as the same is symmetrical. The maximum energy output is attained when the vibrator is set in oscillation at its proper or harmonic frequency. The proper frequency of the vibrator is chosen to be equal or near to the frequency of the periodic exciting power. By attuning the phase of the proper oscillation of the vibrator with the frequency of the periodic exciting power, the state of resonance is attained. The periodic exciting power consists in hydraulic impacts arising by cutting the fluid jet of the stock, and its frequency is provided by the arrangement of the exciting ring. The resonance ring bearing the vibrators is arranged coaxially and is in cooperation with at least one exciting ring. In the field of intensive mechanical oscillation, conditions are created for the formation of an impressive cavitation, cooperating in the fiber processing.

In practice, the proper frequency of the vibrating member or vibrator is determined by computation based on the mathematical elasticity theory. The computation of the circular frequency of bending oscillations of the vibrator is elaborated on the basis of the method of equality of energies, and originates from the consideration that the kinetic energy of the system exerting harmonic oscillatory motion equals in the middle equilibrium position of the system the potential energy that the system possesses in the maximum deviation from the equilibrium position.

If the kinetic energy of the system is $$E_k = \frac{1}{2}\omega^2 \int_0^l my^2 dx$$

and the value of the maximal potential bending energy is $$E_p = \frac{1}{2}\int_0^l M d\vartheta = \frac{1}{2} E \int_0^l I \left(\frac{d^2y}{dx^2}\right)^2 dx$$

then the resonance frequency can be expressed in the form $$\frac{1}{2}\omega^2 \int_0^l my^2 dx = \frac{1}{2} EI \int_0^l \left(\frac{d^2y}{dx^2}\right)^2 dx$$

and $$\omega = \left[\frac{EI \int_0^l \left(\frac{d^2y}{dx^2}\right)^2 dx}{\int_0^l my^2 dx}\right]^{1/2}$$

In these equations $\omega$=circular frequency of oscillation of the vibrating member in sec.$^{-1}$, $m = \frac{\gamma}{g} F$ =mass of 1 cm. length of the vibrating members in kg. cm.$^{-2}$ sec.$^2$, $\gamma$=specific gravity of the material of the vibrating member in kg. cm.$^{-3}$, $g$=acceleration of gravity in cm. sec.$^{-2}$, $F$=cross-sectional area of the vibrating member in cm.$^{-2}$, $M = \frac{d^2y}{dx^2} \cdot EI$ $\vartheta$=slope angles of the tangent to the flexion line in degrees, $E$=modulus of elasticity in tension or compression of the material of the vibrating member in kg. cm.$^{-2}$, $I = \frac{bh^3}{12}$ =moment of inertia in the cross-section of the vibrating member in cm.$^4$, $b$=width of the vibrating member in cm., $h$=thickness of the vibrating member in cm., $y$=deflection or amplitude as the function of the position $x$ to the longitudinal axis of the vibrating member in cm., $l$=corresponding length of the integration range of the vibrating member in cm.

The basic problem in the solution of equality of energy conditions resides in the determination of the amplitude, which is a function of the position of the oscillating point on the longitudinal axis $x$ of the vibrator or vibrating member. The problem is solved by finding the differential equation of the flexion line of the considered vibrator.

The second type of treatment in processing the stock passing through the machine constitutes the non-stationary hydraulic impacts arising from non-stationary streaming of the stock through the beating mechanism. The non-stationary hydraulic impact is effected by abrupt closing of the passage channel formed by the interstice or groove, or as the case may be, by the opening between the neighboring functional organs of the stator or rotor ring, the coinciding of which by functional organs arranged on the circumference of another ring occurs at the point of their close fitting. The abrupt closing of the cross-section of the passage creates at the point of close fitting a lag or negative acceleration which is so considerable that by action of the inertial power of the fluid column a sudden high pressure increase occurs in the space before the closing organ. In case the closing of the interstice takes place instantaneously, which in the present device is practically the fact, there would arise, in case of incompressible fluid in perfectly solid and tight design of the interstice, an infinitely great pressure, in consequence of the infinitely great negative acceleration $a=v/0$, where $a$ is the acceleration in cm. sec.$^{-2}$ and $v$ is the flow rate of the material in cm. sec.$^{-1}$ The processed material or stock is however compressible, which quality relates to the rate of the compression stir propagation, or to the sound velocity in the respective material. Then, the pressure rise at the abrupt braking of the flow rate of the material to zero assumes a finite value. From the equality of the impulse and the momentum there can be derived the relation for the desired overpressure. Thus $$\Delta p = \delta \cdot v \cdot c$$

wherein $\Delta p$=overpressure in $\delta = \gamma/g$=specific mass in kg. cm.$^{-4}$ sec.$^2$ $v$=flow rate of the material in cm. sec.$^{-1}$ $c$=sound velocity in the processed material.

The last, third type of treatment in processing the stock in the beating device constitutes the direct mechanical effects of the functional organs. With a relatively larger clearance between the surfaces of functional organs of the rotor and of the cooperating organs of the stator or the counterrunning rotor, at all times the corresponding portion of the material is intensively treated in the layer passing through said clearance. The fibers are subjected to strain predominantly by friction, pressure and flexure due to cooperation of the functional organs. The stock particles moving in the clearance, like moving in a circulation channel, are affected, at equilibrium in the radial direction, by forces causing a pressure increase in the direction of the radius.

The equation of force equilibrium in the direction of the radius may be written in the following form:

$$l \cdot ds \cdot p + \frac{\gamma}{g} \cdot l \cdot ds \cdot dr \cdot \frac{c^2}{r} = l \cdot ds (p + dp)$$

wherein $l.ds$ is the elementary area of the considered stock particle in cm.$^2$, $p$ is the pressure acting on the elementary area in kg. cm.$^{-2}$, the expression $$\frac{\gamma}{g} \cdot l \cdot ds \cdot dr \cdot \frac{c}{p}$$

represents the centrifugal force acting on the elementary stock particle in kg., $c$ is the flow rate in cm. sec.$^{-1}$.

The expression $l.ds(p+dp)$ signifies the pressure acting on the elementary area of the stock particle, distant by the value $dr$ from the initially considered elementary area in the direction of radius $r$; $dp$ representing the pressure increase in the direction of the radius $r$.

Transformation of the equation produces the equation $$\frac{c^2}{g} \cdot \frac{dr}{r} = \frac{dp}{\gamma}$$

For the streaming of the flow-through volume in the clearance Bernoulli's equation applies.

$$\frac{p}{\gamma} + \frac{c^2}{2g} = \text{constant}$$

For the elementary flow-through, the following equation applies:

$$\frac{dp}{\gamma} + \frac{c \cdot dc}{g} = 0$$

so that $$\frac{dp}{\gamma} = -\frac{c \cdot dc}{g}$$

wherein $dc$ represents the rate of change in the direction of radius $r$. From the equality of both expressions for $dp/\gamma$ there follows:

$$\frac{c \cdot dc}{g} = \frac{c^2}{g} \cdot \frac{dr}{r}$$

and on transformation there results:

$$\frac{dc}{c} + \frac{dr}{r} = 0$$

Integration of the expression in the direction of radius provides:

$$ln.c + ln.r = ln.k$$

and then:

$$c.r = \text{constant}$$

which signifies that the streaming in the clearance is of circulatory character and corresponds to the law of potential vortex. The width of the clearance can be adjusted according to the desired effects, that is to restrict the shortening, or on the contrary, with a view to the desired degree of shortening, of the fiber.

The design arrangement of the rotor provides the beating device with a high pumping effect, which on the one hand, absolutely prevents clogging of the machine during operation, and on the other hand, speeds up the flowing stock, which is manifested by the increased steepness of the front of the non-stationary hydraulic impact.

Figure 1:
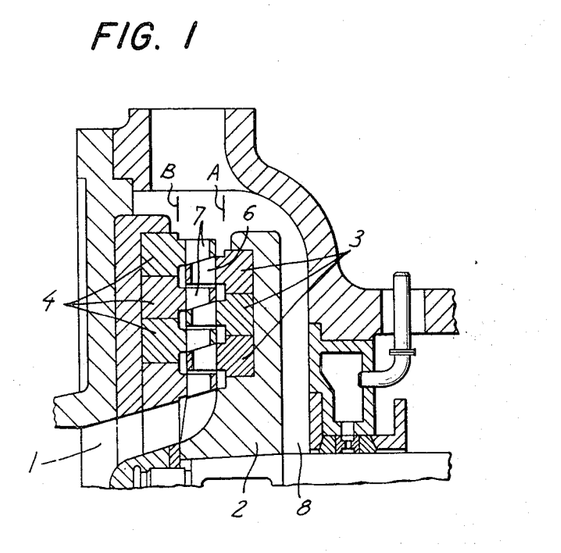
FIG. 1 is a partial axis section of an embodiment of the beating device of the present invention.
Figure 1A:
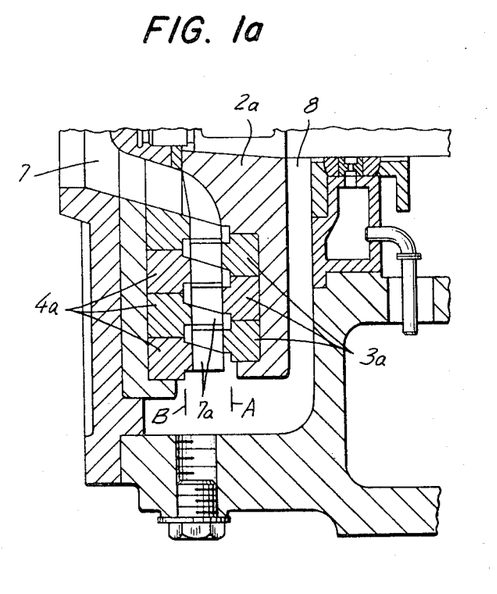
FIG. 1a is a partial axial section of another embodiment of the invention.

In FIG. 1, the stock to be processed by the machine is fed in via the inlet neck 1. Its passage through the machine is assisted by moving blades of the rotor 2, which at the same time feeds the stock into the working zone of the beating device.

Disintegrator rings 3 of the rotor and the rings 4 of the stator, or those of a counterrunning rotor, are provided with functional organs, not shown in FIG. 1. The functional organs are designed either as bilaterally fixed beams 5, 5b and 7', 7b', as shown in FIGS. 1–3 and 6, 7, or as unilaterally fixed beams 5a, 5c as shown in FIGS. 1a–4a, 8–10. Rings with bilaterally fixed beams show a great stability. The beams designed as vibrators, the resonant frequency of which is determined mathematically, are placed on the resonance ring such as, for example, the ring 3, and carry out bending oscillations during the operation of the device. The shape of the beam deflections in oscillation is marked by the dotted lines 5' and 5" in FIGS. 3 and 3a. The resonance ring 3 is placed, for example, between two exciting rings 4.

The entering stock to be processed is made to change its flow direction from the axial to the radially centrifugal one along the guide blades of the rotor. The stock passes under hydraulic pressure successively through the individual processing zones and leaves at the circumference of the rotor into the machine box 8. The stock is then led from the machine box 8 by means not shown to an area in which it is subjected to further technological processing.

Figure 2:
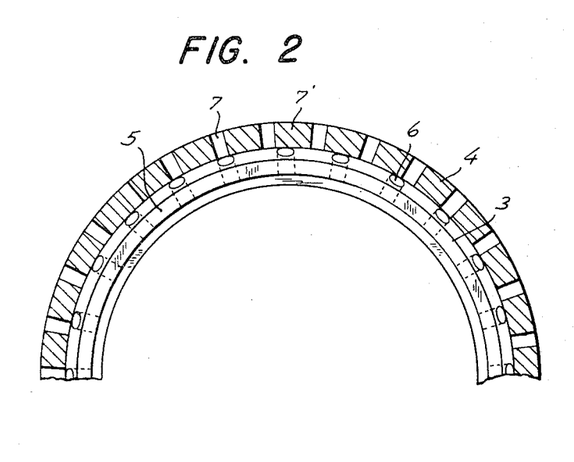
FIG. 2 is an elevation, as seen in the axial direction, of a rotor and a stator of the embodiment of FIG. 1, only the stator being shown in section along line II—II of FIG. 4.
Figure 2A:
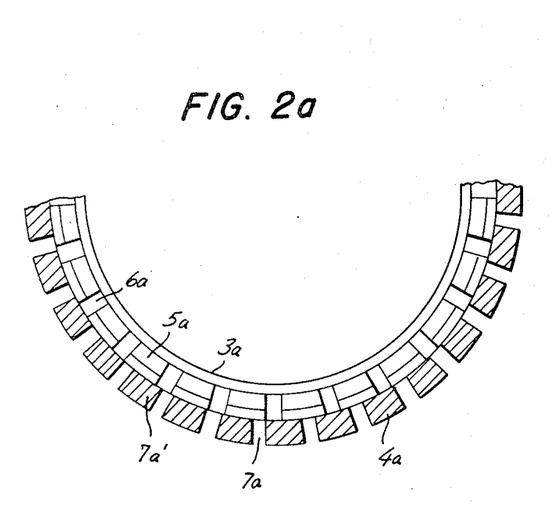
Figure 3:
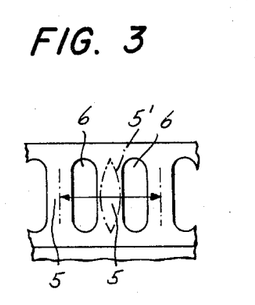
FIG. 3 is a developed partial view, as seen in the radial direction of the rotor, of the rotor of FIGS. 1 and 2.
Figure 3A:
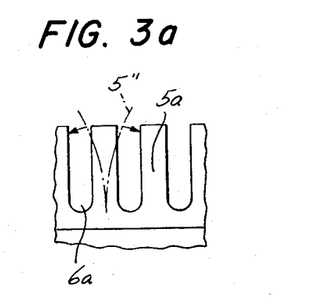
Figure 4:
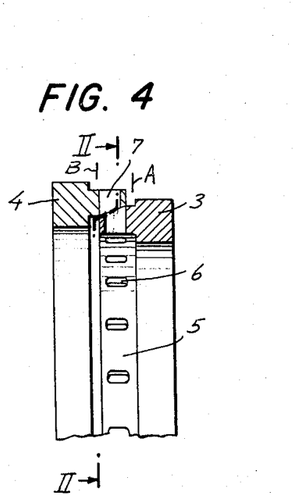
FIG. 4 is a side elevation of a rotor and a stator of FIGS. 1 and 2 in axial section.
Figure 4A:
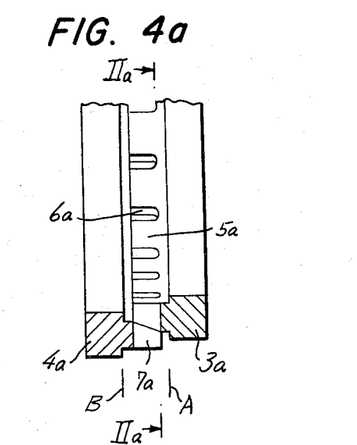

FIGS. 2, 3 and 4 illustrates specifically the details of the arrangement according to FIG. 1. It can be seen from FIGS. 1–4 that the rotor 2 is provided with three concentric resonance rings 3 and that the stator comprises four exciting rings 4 which intermesh as shown in FIG. 1. This is due to the fact that from each ring 3 a plurality of beams 5 project substantially parallel with the axis thereof from a general reference plane A toward the stator rings 4, the beams 5 being spaced from each other by radially extending passages 6. On the other hand, similar beams 7' spaced from each other in circumferential direction by passages 7 project from a similar reference plane B in substantially axial direction toward the rotor 2. The beams 5 as well as the beams 7' are provided with faces closely adjacent to each other so that the passages 6 find a continuation in the corresponding passages 7 whenever during the rotation of the rotor 2 passages 6 are in radial alignment with corresponding passages 7 as can be seen from FIGS. 1 and 2. The total number of passages 7 should not be identical with the total number of passages 6 so that during the rotation of the rotor a corresponding frequency of alternating opening and closing of these passages is effected, this frequency being calculated to be substantially equal to the resonant frequency of the beams 5 of a resonance ring 3.

Substantially the same description applies to the embodiment illustrated by FIGS. 1a–4a. Corresponding parts of the arrangement carry the same reference numeral as in the first example except that a suffix $a$ is added. The main difference between the first described embodiment and the embodiment according to FIGS. 1a–4a is that the beams 5a are only at one end integral with the respective ring 3a.

Figures 5, 6:
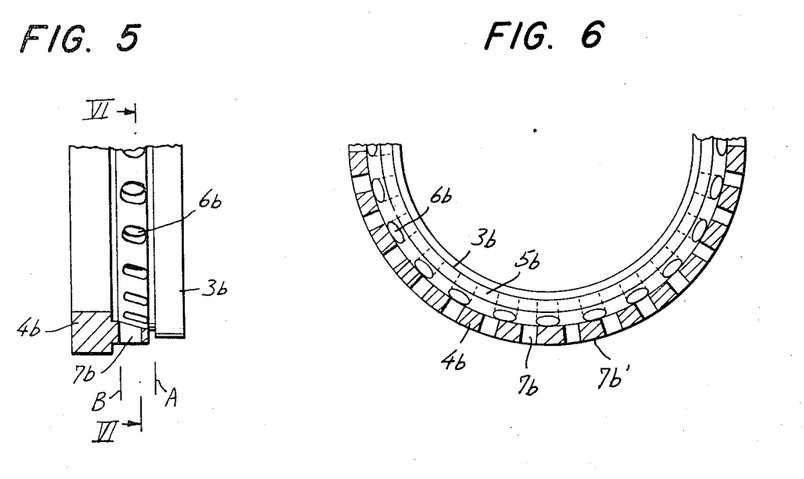
FIG. 5 is a side elevation of a rotor and a stator of a further embodiment of the invention, only the stator being shown in axial section.
FIG. 6 is an elevation in the axial direction of the rotor, of the stator and rotor of FIG. 5, only the stator being shown in section along line VI—VI of FIG. 5.
Figure 7:
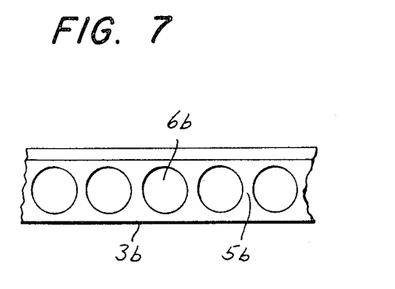
FIG. 7 is a developed view, as seen in the radial direction of the rotor, of the rotor of FIGS. 5 and 6.

The embodiment illustrated by FIGS. 5–7 is similar to the above described embodiments. Therefore corresponding elements are designated by the same reference numerals except with the addition of a suffix $b$. The difference between this embodiment and the priviously described ones is only that the passages 6b through the resonance ring 3b are of substantially cylindrical form.

Figure 8:
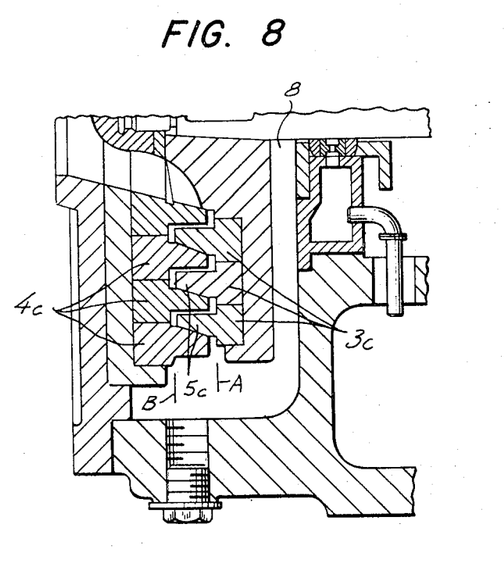
FIG. 8 is a partial axial section of a further embodiment of the invention.
Figure 9:
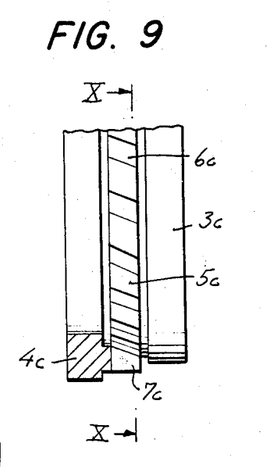
FIG. 9 is an axial section of a portion of the stator, and a view of the cooperating rotor of the beating device of FIG. 8 illustrating a preferred configuration of beam.
Figure 10:
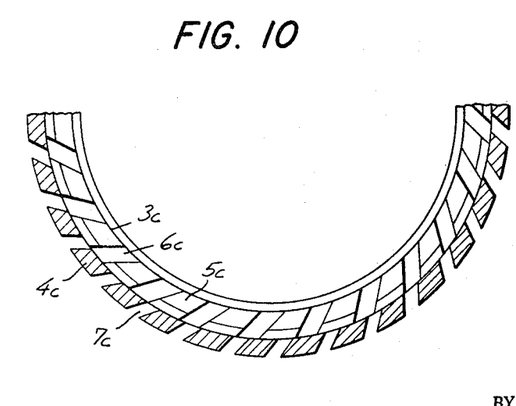
FIG. 10 is an elevation, seen in axial direction, of a rotor and stator of FIGS. 8 and 9, only the stator shown in section.

FIGS. 8–10 illustrate a further embodiment which functions generally in the same manner as the above described ones and is also similarly constructed. Therefore corresponding elements carry the same reference numerals as above except with the addition of a suffix $c$. The main difference is that in this embodiment the passages 6c and 7c do not extend in substantially radial direction as in the previous examples but are oriented to extend at a certain angle relative to the radius from the center of the rings 3c and 4c, respectively, to the location of the particular passage. Hereby the pumping effect of the rotor is enhanced.

Figure 11:
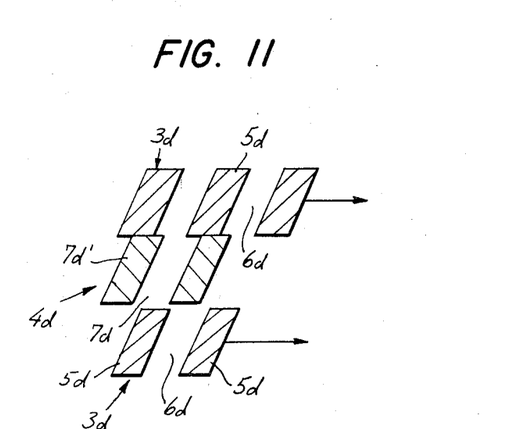
FIG. 11 is a diagrammatic view of the beams of a device according to the invention having two rotors.

Finally, FIG. 11 diagrammatically illustrates a further modification of the above described embodiments. In this case the passages 6d and the respective beams 5d of two resonance rings 3d as well as the corresponding passages 7d and respective beams 7d' of a stator ring 4d located between the rings 3d are inclined in a plane transverse to the axis of rotation. Also in this manner the pumping effect of the rotors is increased.

By combining the aforementioned effects, the beating device of the present invention permits the attainment of a high specific effect on the fiber or on the processed stock by a single passage through the machine. The increased effectiveness of the device permits an excessive reduction of the dimensions of the machine and of the number of machine units in the beating line.

The passages through the machine permit the resolution of the total flow of the stock to small zones forming areas in which only practically uniform types of fiber strain occur. If processing is undertaken in such partial areas, a homogeneity of the processed stock is attained. By combination of various types of fiber strain, a fine adjustability and controllability of the beating process, and thereby the predetermined qualities of the processed material, could be attained.

The device according to the invention may be used as well for the processing of various materials in other industrial branches.

While the invention has been described by means of specific examples and in specific embodiments, I do not wish to be limited thereto, for obvious modifications will occur to those skilled in the art without departing from the spirit and scope of the invention.

What I claim is:

1. A beating device for the continuous processing of material stock comprising, in combination, a resonance ring having an axis and a reference plane transverse to its axis; a first plurality of beams projecting in substantially axial direction from said reference plane of said resonance ring and being separated from each other by substantially radial passages and adapted to oscillate at a determined resonance frequency; an exciting ring having an axis and a second reference plane transverse to its axis; a second plurality of beams projecting in substantially axial direction from said second reference plane of said exciting ring and being separated from each other by substantially radial passages, said beams of said exciting ring being of a determined number and having a determined configuration, determined positions and a determined circular pitch such that the beams of said exciting ring provide by cooperation of said passages in said resonance and exciting rings, respectively, a frequency resonant to the determined resonance frequency of the beams of said resonance ring; mounting means mounting said resonance ring and said exciting ring rotatably relative to each other and coaxially with each other with a face of each of said rings adjacent a face of the other of said rings; input means for feeding material stock to said passages of said exciting ring; and output means for deriving the beaten stock from said passages of said resonance ring.

2. A beating device for the continuous processing of material stock comprising, in combination, a resonance ring having an axis and a reference plane transverse to its axis; a first plurality of bilaterally fixed substantially axially extending beams projecting in substantially axial direction from said reference plane of said resonance ring and being separated from each other by substantially radial passages and adapted to oscillate at a determined resonance frequency; an exciting ring having an axis and a second reference plane transverse to its axis; a second plurality of substantially axially extending beams projecting in substantially axial direction from said second reference plane of said exciting ring and being separated from each other by substantially radial passages, said beams of said exciting ring being of a determined number and having a determined configuration, determined positions and a determined circular pitch such that the beams of said exciting ring provide by cooperation of said passages in said resonance and exciting rings, respectively, a frequency resonant to the determined resonance frequency of the beams of said resonance ring; mounting means mounting said resonance ring and said exciting ring rotatably relative to each other and coaxially with each other with a face of each of said rings adjacent a face of the other of said rings; input means for feeding material stock to said passages of said exciting ring; and output means for deriving the beaten stock from said passages of said resonance ring.

3. A beating device for the continuous processing of material stock comprising, in combination, a resonance ring having an axis and a reference plane transverse to its axis; a first plurality of unilaterally fixed substantially axially extending beams projecting in substantially axial direction from said reference plane of said resonance ring and being separated from each other by substantially radial passages and adapted to oscillate at a determined resonance frequency; an exciting ring having an axis and a second reference plane transverse to its axis; a second plurality of substantially axially extending beams projecting in substantially axial direction from said second reference plane of said exciting ring and being separated from each other by substantially radial passages, said beams of said exciting ring being of a determined number and having a determined configuration, determined positions and a determined circular pitch such that the beams of said exciting ring provide by cooperation of said passages in said resonance and exciting rings, respectively, a frequency resonant to the determined resonance frequency of the beams of said resonance ring; mounting means mounting said resonance ring and said exciting ring rotatably relative to each other and coaxially with each other with a face of each of said rings adjacent a face of the other of said rings; input means for feeding material stock to said passages of said exciting ring; and output means for deriving the beaten stock from said passages of said resonance ring.

4. A beating device for the continuous processing of material stock comprising, in combination, a resonance ring having an axis and a reference plane transverse to its axis; a first plurality of functional organs projecting in substantially axial direction from said reference plane of said resonance ring and being separated from each other by substantially radial passages, said functional organs being adapted to oscillate; an exciting ring having an axis and a second reference plane transverse to its axis; a second plurality of functional organs projecting in substantially axial direction from said second reference plane of said exciting ring and being separated from each other by substantially radial passages; mounting means mounting said resonance ring and said exciting ring rotatably relative to each other and coaxially with each other with a face of each of said rings adjacent a face of the other of said rings; means for causing relative rotation of said rings at a predetermined speed and for thereby causing oscillation of said functional organs of said resonance ring in circumferential direction relative to its axis in a face of said resonance ring at a resonance frequency $\omega$ determined by the equation $$\omega = \left[ \frac{EI \int_0^l \left( \frac{d^2y}{dx^2} \right)^2 dx}{\int_0^l my^2 dx} \right]^{1/2}$$

where $\omega$ is the frequency of vibration of any one of said functional organs of said resonance ring in sec.$^{-1}$, $m = \gamma/g$. F is the mass of one cm. length of said one of said functional organs in kg. cm.$^{-2}$ sec.$^2$, $\gamma$ is the specific gravity of the material of said one of said functional organs in kg. cm.$^{-3}$, $g$ is the acceleration of gravity in cm. sec.$^{-2}$, F is the cross-sectional area of said one of said functional organs in cm.$^2$, E is the modulus of elasticity of the material of said functional organs in kg. cm.$^{-2}$ I is $= bh^3/12 =$ the moment of inertia in the cross-section of said one of said functional organs in cm.$^4$, $b$ is the width of said one of said functional organs in cm., $h$ is the thickness of said one of said functional organs in cm., $y$ is the deflection as the function of the position $x$ to the longitudinal axis of said one of said functional organs in cm., and $l$ is the corresponding length of the integration range of said one of said functional organs in cm.; input means for feeding material stock to said passages of said exciting ring; and output means for deriving the beaten stock from the said passages of said resonance ring.

5. A beating device for the continuous processing of material stock comprising, in combination, a resonance ring having an axis and a reference plane transverse to its axis; a first plurality of functional organs projecting in substantially axial direction from said reference plane of said resonance ring and being separated from each other by substantially radial passages, said functional organs comprising spaced beams adapted to oscillate; an exciting ring having an axis and a second reference plane transverse to its axis; a second plurality of functional organs projecting in substantially axial direction from said second reference plane of said exciting ring and being separated from each other by substantially radial passages, said second plurality of functional organs comprising spaced beams; mounting means mounting said resonance ring and said exciting ring rotatably relative to each other and coaxially with each other with a face of each of said rings adjacent a face of the other of said rings with the beams of each of said rings in varying relationship to the beams of the other of said rings during relative rotation of said rings; means for causing relative rotation of said rings at a predetermined speed and for thereby causing oscillation of said beams of said resonance ring in circumferential direction relative to its axis in a face of said resonance ring at a resonance frequency $\omega$ determined by the equation $$\omega = \left[ \frac{EI \int_0^l \left( \frac{d^2y}{dx^2} \right)^2 dx}{\int_0^l my^2 dx} \right]^{1/2}$$

where $\omega$ is the frequency of vibration of any one of said resonance ring beams in sec.$^{-1}$, $$m = \frac{\gamma}{g} \cdot F$$

is the mass of one cm. length of said one of said beams in kg. cm.$^{-2}$ sec.$^2$, $\gamma$ is the specific gravity of the material of said one of said beams in kg. cm.$^{-3}$, $g$ is the acceleration of gravity in cm. sec.$^{-2}$, F is the cross-sectional area of said one of said beams in cm.$^2$, E is the modulus of elasticity of the material of said beams in kg. cm.$^{-2}$, I is=$bh^3/12$=the moment of inertia in the cross-section of said one of said beams in cm.$^4$, $b$ is the width of said one of said beams in cm., $h$ is the thickness of said one of said beams in cm., $y$ is the deflection as the function of the position $x$ to the longitudinal axis of said one of said beams in cm., and $l$ is the corresponding length of the integration range of said one of said beams in cm.; input means for feeding material stock to said passages of said exciting ring; and output means for deriving the beaten stock from said passages of said resonance ring.

6. A beating device for the continuous processing of material stock comprising, in combination, a resonance ring having an axis and a reference plane transverse to its axis; a first plurality of functional organs projecting in substantially axial direction from said reference plane of said resonance ring, said functional organs comprising beams substantially axially extending and being separated from each other by substantially radial passages and adapted to oscillate in circumferential direction relative to said axis in a face of said resonance ring; an exciting ring having an axis and a second reference plane transverse to its axis; a second plurality of functional organs projecting in substantially axial direction from said second reference plane of said exciting ring and being separated from each other by substantially radial passages, said second plurality of functional organs comprising spaced substantially axially extending beams; mounting means mounting said resonance ring and said exciting ring rotatably relative to each other and coaxially with each other with a face of each of said rings adjacent a face of the other of said rings with the beams of each of said rings in varying relationship to the beams of the other of said rings during relative rotation of said rings; means for causing relative rotation of said rings at a predetermined speed and for thereby causing oscillation of said beams of said resonance ring in circumferential direction relative to its axis in a face of said resonance ring at a resonance frequency $\omega$ determined by the equation $$\omega = \left[ \frac{EI \int_0^l \left( \frac{d^2y}{dx^2} \right)^2 dx}{\int_0^l my^2 dx} \right]^{1/2}$$

where $\omega$ is the frequency of vibration of any one of said resonance ring beams in sec.$^{-1}$, $$m = \frac{\gamma}{g} \cdot F$$

is the mass of one cm. length of said one of said beams in kg. cm.$^{-2}$ sec.$^2$, $\gamma$ is the specific gravity of the material of said one of said beams in kg. cm.$^{-3}$, G is the acceleration of gravity in cm. sec.$^{-2}$, F is the cross-sectional area of said one of said beams in cm.$^2$, E is the modulus of elasticity of the material of said beams in kg. cm.$^{-2}$, I is=$bh^3/12$=the moment of inertia in the cross-section of said one of said beams in cm.$^4$, $b$ is the width of said one of said beams in cm., $h$ is the thickness of said one of said beams in cm., $y$ is the deflection as the function of the position $x$ to the longitudinal axis of said one of said beams in cm., and $l$ is the corresponding length of the integration range of said one of said beams in cm.; input means for feeding material stock to said passages of said exciting ring; and output means for deriving the beaten stock from said passages of said resonance ring.

7. A beating device for the continuous processing of material stock comprising, in combination, a resonance ring having an axis and a reference plane transverse to its axis; a first plurality of spaced beams projecting in substantially axial direction from said reference plane of said resonance ring and being separated from each other by substantially radial passages and adapted to oscillate at a determined resonance frequency; an exciting ring having an axis and a second reference plane transverse to its axis; a second plurality of spaced beams projecting in substantially axial direction from said second reference plane of said exciting ring and being separated from each other by substantially radial passages, said beams of said exciting ring being of a determined number and having a determined configuration, determined positions and a determined circular pitch such that the beams of said exciting ring provide by cooperation of said passages in said resonance and exciting rings, respectively, a frequency resonant to the determined resonance frequency of the beams of said resonance ring; mounting means mounting said resonance ring and said exciting ring rotatably relative to each other and coaxially with each other with a face of each of said rings adjacent a face of the other of said rings; means for causing relative rotation of said rings at a predetermined speed and for thereby causing oscillation of said beams of said resonance ring in circumferential direction relative to its axis in a face of said resonance ring at said determined resonance frequency, said determined resonance frequency being a frequency $\omega$ determined by the equation $$\omega = \left[ \frac{EI \int_0^l \left( \frac{d^2y}{dx^2} \right)^2 dx}{\int_0^l my^2 dx} \right]^{1/2}$$

where $\omega$ is the frequency of vibration of any one of said resonance ring beams in sec.$^{-1}$, $$m = \frac{\gamma}{g} \cdot F$$

is the mass of one cm. length of said one of said beams in kg. cm.$^{-2}$ sec.$^2$, $\gamma$ is the specific gravity of the material of said one of said beams in kg. cm.$^3$, G is the acceleration of gravity in cm. sec.$^{-2}$, F is the cross-sectional area of said one of said beams in cm.$^2$, E is the modulus of elasticity of the material of said beams in kg. cm.$^{-2}$, I is=$lh^3/12$=the moment of inertia in the cross-section of said one of said beams in cm.$^4$, b in the width of said one of said beams in cm., h is the thickness of said one of said beams in cm., y is the deflection as the function of the position x to the longitudinal axis of said one of said beams in cm., and l is the corresponding length of the integration range of said one of said beams in cm.; input means for feeding material stock to said passages of said exciting ring; and output means for deriving the beaten stock from said passages of said resonance ring.

References Cited
UNITED STATES PATENTS

| | | | |
|---|---|---|---|
| 211,576 | 1/1879 | Lawton | 241—188.5 X |
| 250,125 | 11/1881 | Bennett | 241—188.5 X |
| 273,829 | 3/1883 | Elbreg | 241—188.5 X |
| 2,709,552 | 5/1955 | Lecher | 241—1 |
| 3,062,457 | 11/1962 | Willems | 241—1 |
| 3,194,540 | 7/1965 | Hager | 241—86 X |

OTHER REFERENCES

Harris: Shock and Vibration Handbook, 1961, pp. 7–2 and 7–3.

ROBERT C. RIORDON, *Primary Examiner.*

D. G. KELLY, *Assistant Examiner.*

U.S. Cl. X.R.

241—251, 266